United States Patent [19]
Maulding

[11] 3,821,229
[45] June 28, 1974

[54] DIQUATERNARY SALTS OF DI-4-PYRIDYL KETONE

[75] Inventor: Donald Roy Maulding, Branchburg, Township, Somerest Cty., N.J.

[73] Assignee: American Cyanamid Company, Stamford, Conn.

[22] Filed: Dec. 7, 1972

[21] Appl. No.: 313,028

[52] U.S. Cl............ 260/294.8 R, 260/295 AM, 260/295 Q, 260/302 F, 260/302 R, 204/158 R, 252/188.3, 252/301.3

[51] Int. Cl............................................ C07d 31/44

[58] Field of Search ...... 260/294.8 R, 295 AM, 296

[56] References Cited
UNITED STATES PATENTS
3,206,383   9/1965   Kappel............................ 260/297 R Primary Examiner—Alan L. Rotman
Attorney, Agent, or Firm—Charles Joseph Fickey

[57] ABSTRACT

New compounds which are bis aryl ketones where the aryl group contains nitrogen or nitrogen and sulfur, which are useful in chemiluminescent compositions.

5 Claims, No Drawings

DIQUATERNARY SALTS OF DI-4-PYRIDYL KETONE

This invention relates to the preparation of new compounds which are diaryl ketones and diquaternary salts thereof. It relates more specifically to a method of preparation of diquaternary salts of di-4-pyridyl ketone and to the salts obtained. The invention further relates to chemiluminescent compositions comprising the new compounds of this invention.

The new compounds of the present invention have the general structural formula

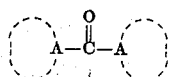

where

represents a nitrogen or nitrogen and sulfur containing aryl group, as exemplified by compounds of the following structures:

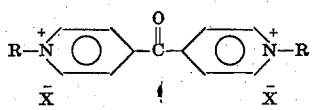  I

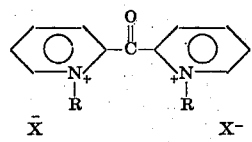  II

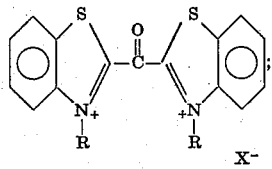  III

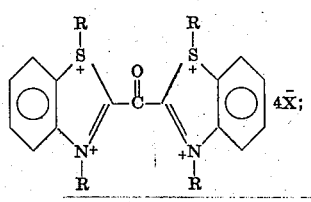  IV

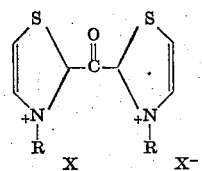  V where R=H or alkyl (of up to 8 or more carbon atoms), and X=Cl⁻, Br⁻, I⁻,

etc. compounds of this type may provide chemiluminescence in aqueous systems. The new compounds are useful as dyes or in color imaging applications, and in chemiluminescent compositions.

Ultraviolet irradiation of the dimethochloride (R=CH₃, X=Cl) in methanol or isopropanol gave a bright red color. The red solution immediately became deep blue when dilute alkali was added. When dilute base was added to a solution of the dimethochloride in isopropanol without prior irradiation, a deep blue color formed, but not instantaneously. That the methyl groups in the dimethochloride had an effect on the formation of the red color was shown by irradiation of the dihydrochloride (R=H, X=Cl). At room temperature a pink color was produced, but at 77°K a deep red color developed, which slowly faded when warmed to room temperature.

The dimethochlorides R=CH₃, X=I; R=CH₃, X=

and the dihydrochloride (R=H, X=Cl) were found to be chemiluminescent when reacted with hydrogen peroxide in the presence of a flourescer, e.g. 9,10-bis(-phenylethynyl)-anthrancene, and an organic solvent. Other suitable flourescers and solvents are disclosed in U.S. Pat. No. 3,576,987.

The following specific examples are set forth to illustrate the invention and are not intended to be limitative.

EXAMPLE I

Di-4-pyridyl Ketone — The dipyridyl ketone was prepared from 4-bromopyridine, n-butyl lithium and 4-cyanopyridine according to the procedure described by J. P. Wilbant and L. G. Herringa, *Rec. Trav. Chim.*, 74, 1003 (1955).

EXAMPLE II

Di-4-Pyridyl Ketone Dihydrochloride Monohydrate — Anhydrous hydrogen chloride was bubbled into a solution of 0.5 g. of di-4-pyridyl ketone in 20 ml. of anhydrous methanol until no more precipitate formed. The yield of the white solid, m.p., 258°–260° was 0.61 g., or 88%.

Anal. Calcd. for $C_{11}H_{12}N_2O_2Cl_2$: C, 48.0; H, 4.4; Cl, 25.8; N, 10.2.

Found: C, 47.9; H, 4.5; Cl, 25.8; N, 9.8.

EXAMPLE III 4,4'-Carbonylbis[1,methylpyridinium iodide]-Monohydrate — A mixture of 0.37 g. [12 mole] of methyl iodide in 20 ml. of absolute methanol was heated at 100° in a 100 ml. stainless steel autoclave for 7 hours. Evaporation of the volatile material yielded a black gum, which became a brown solid, wt. 0.82 g., 89%, when heated in refluxing acetone. Recrystallization of 20 mg. from 150 ml. of acetone yielded a red-orange solid, m.p., 253°–255° [dec.]; infrared, 2.90, 5.91 and 6.08 u.

Anal. Calcd. for $C_{13}H_{16}I_2N_2O_2$: C, 32.1; H, 3.3; I, 52.2.

Found: C, 32.7; H, 3.2; I, 51.9.

A 47% yield of the monohydrate was obtained when 0.37 g. of ketone and 1.69 g. of methyl iodide were heated under nitrogen in 25 ml. of absolute methanol for 5 hours.

EXAMPLE IV 4,4'-Carbonylbis[1-methylpyridinium chloride]Di- and Trihydrate — The dimethochloride was prepared by dissolving the dimethiodide in water and passing the solution through a column packed with Dowex-1-X₄ ion-exchange resin. Evaporation of the water gave a gum, which became a maroon solid, m.p., 130°–141° when heated in refluxing acetonitrile. A light pink solid, m.p., 190°–193° was formed when the maroon product was heated in boiling isopropanol. The melting point was changed to 184.5°–187.5° when the light pink solid was dried over phosphorus pentoxide at 110°/0.3 mm. Exposure to air caused the melting point to revert to 190°–193°.

Anal. Calcd. for $C_{13}H_{20}Cl_2N_2O_4$[m.p., 190°–193°]: C, 46.1; H, 5.9; Cl, 20.9; N, 8.3.

Found: C, 46.6; H, 5.3; Cl, 21.6; N, 8.8.

EXAMPLE V 4,4'-Carbonyl bis[1-methylpyridinium tosylate] — A slurry of 0.5 g. of di-4-pyridyl ketone and 1.8 g. of methyl p-toluenesulfonate was heated in a closed flask on a steam bath for 5–6 min. All the solid dissolved in the purple solution. Cooling gave a precipitate which was washed with benzene. The hygroscopic material was dried over $P_2O_5$ at 110° (0.3 mm) for 5 hours. The melting point of the dried material was 135°–140°.

Irradiation of the solutions of the solid in isopropanol with a G.E. BH-6 lamp (Pyrex filter) gave pink solutions.

EXAMPLE VI

Irradiation of Di-4-pyridyl Ketone Dihydrochloride Monohydrate — A solution of 0.26 g. (0.001 mole) of the dihydrochloride, 50 ml. of methanol and 125 ml. of isopropanol while under nitrogen was irradiated with a G.E. BH-6 lamp (Pyrex filter) for 4½ hours. A faint red color appeared. A deep red color appeared when a 3 ml. aliquot was irradiated at 77°K, and slowly faded at room temperature.

EXAMPLE VII

Color Reactions of 4,4'-Carbonylbis[1-methylpyridinium chloride] Trihydrate — A red color immediately developed when a solution of 0.14 g. (0.5 mmole) of the trihydrate and 100 ml. of isopropanol was irradiated with a G.E. BH-6 lamp (Pyrex filter). Addition of 10% aq. NaOH gave a deep blue color. In another experiment a deep blue color developed when a solution of 40 mg. of NaOH in 35 ml. of 25% methanol-isopropanol was added dropwise to 0.14 g. of the dimethochloride in 25 ml. of methanol.

EXAMPLE VIII

Chemiluminescence of Diquaternary Salts of Di-4-pyridyl Ketone — Visible emission was observed in a dark room by adding 3 ml. of 1.0 M $H_2O_2$ in 3-methyl-3-pentanol to a solution of 25–50 mg. of diquaternary salt and 3–5 mg. of 9,10-bis(phenylethynyl)enthracene in 10 ml. of dibutyl phthalate. The intensity of emission was compared with the intensity of a luminol system: Compound III gave brief and weak emission in an aqueous solution of $H_2O_2$ and the sodium salt of fluorescein.

| Compound | Intensity |
|---|---|
| 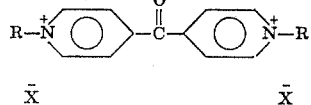 | |
| I. R=H, X=Cl | Weak. |
| II. R=CH₃, X=I | Do. |
| III. R=CH₃, X=CH₃-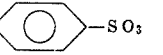–SO₃ | Medium. |

I claim:
1. A compound of the formula

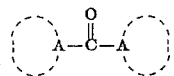

wherein

A is 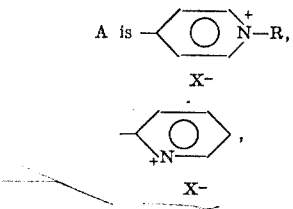

R is H, or lower alkyl, X is chloro, bromo, iodo or

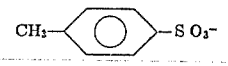

ion.

2. Di-4-pyridyl ketone dihydrochloride monohydrate as in claim 1.

3. 4,4'-carbonylbis(1-methylpyridinium iodide) monohydrate as in claim 1.

4. 4,4'-carbonylbis(1-methylpyridinium chloride)-dihydrate as in claim 1.

5. 4,4'-carbonylbis(1-methylpyridinium tosylate) as in claim 1.

* * * * *